July 31, 1923.
G. O. CURME, JR., ET AL
1,463,255
PROCESS OF PREPARATION OF BENZOATES AND BENZOIC ACID FROM DIBENZYL
Filed April 20, 1917
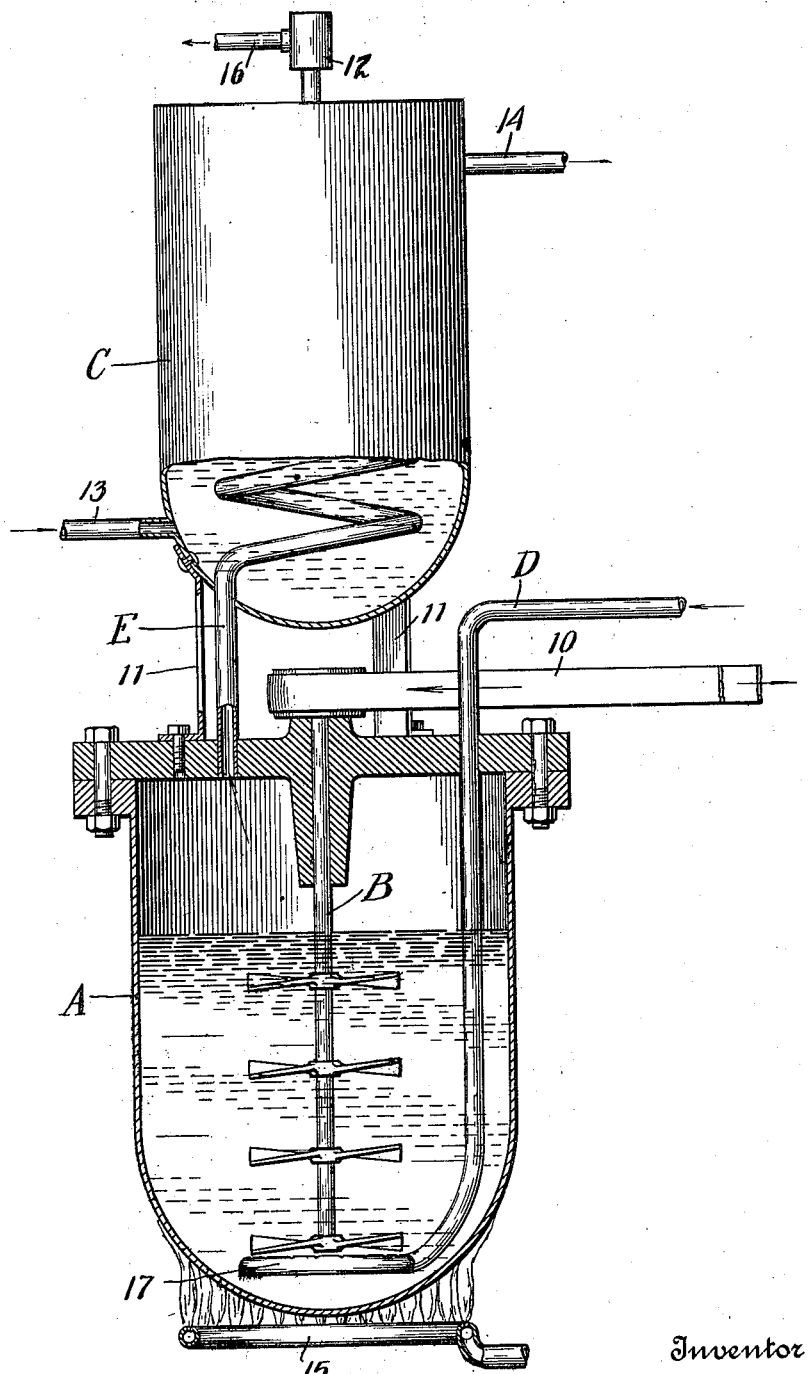
Inventor
George O. Curme Jr,
Herman B. Heyn,
By Bradford & Doolittle,
Attorneys.

Patented July 31, 1923.

1,463,255

UNITED STATES PATENT OFFICE.

GEORGE OLIVER CURME, JR., AND HERMAN BUNSEN HEYN, OF PITTSBURGH, PENNSYLVANIA, ASSIGNORS, BY MESNE ASSIGNMENTS, TO UNION CARBIDE COMPANY, OF NEW YORK, N. Y., A CORPORATION OF VIRGINIA.

PROCESS OF PREPARATION OF BENZOATES AND BENZOIC ACID FROM DIBENZYL.

Application filed April 20, 1917. Serial No. 163,522.

*To all whom it may concern:*

Be it known that we, GEORGE O. CURME, Jr., a citizen of the United States, residing at Pittsburgh, Allegheny county, and State of Pennsylvania, and HERMAN B. HEYN, a citizen of the United States, residing at Pittsburgh, Allegheny County, and State of Pennsylvania, have invented and discovered certain new and useful Improvements in Processes of Preparation of Benzoates and Benzoic Acid from Dibenzyl, of which the following is a specification.

The object of this process is to prepare benzoic acid, or as the case may be, the salts of the same in a pure form. The starting material which we use in said process is dibenzyl, a hydrocarbon of the composition represented by the formula $C_{14}H_{14}$, which itself is well known in chemical science. We have discovered that, by a process of oxidation, it can be transformed to benzoic acid, or salts of the same, utilizing indirectly for said oxidation the oxygen of the air or molecular oxygen obtained from any other source.

That dibenzyl, in common with all hydrocarbons, can be burned, i. e., completely oxidized, by molecular oxygen is common knowledge, but that which we claim to be new is that by means of molecular oxygen using our process, which will be described, dibenzyl can be oxidized indirectly by molecular oxygen in a regulatable manner to give benzoic acid in the form of its salts, and indeed, in amount corresponding almost quantitatively with that demanded by the theory for a reaction corresponding to the equation:

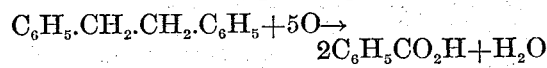
$$C_6H_5.CH_2.CH_2.C_6H_5 + 5O \rightarrow 2C_6H_5CO_2H + H_2O$$

The essential feature of our process is that the molecular oxygen is first rendered available for this oxidation by combination with other substances which are also placed in the reaction chamber, and the intermediate compound thus formed is the active agent in producing the desired oxidation. By suitable choice of these additional oxygen-fixing substances, such as, for example, a mixture of sodium hydroxide and manganese dioxide, it is possible to form the intermediate oxygen-carrying substance (in the case given it would be sodium manganate) continuously, and, also at the same time this latter oxidizes the dibenzyl continuously to give benzoic acid, or the salts of the same, and by thus giving up its oxygen it is itself reduced to its previous state (manganese dioxide in the case given). In the case given, a certain amount of the alkali is neutralized by the benzoic acid formed and so a certain change is brought about in the oxygen carrying mixture, but provided that this constitutent of the mixture is present in excess over that demanded by the quantity of dibenzyl present, the same material can then take up more oxygen, oxidize more dibenzyl as before, and continue this cyclic process indefinitely, as long as oxygen and dibenzyl both are present and until all of the dibenzyl has been oxidized to benzoic acid or salts of the same. Thus, small quantities of the oxygen-carrying substance can transform large quantities of dibenzyl to benzoic acid or salts of the same indefinitely without itself being consumed or its power diminished, provided only that sufficient alkali is present or is added during the course of the reaction, to compensate for the portion neutralized by the product of the reaction. The benzoic acid when neutralized is then present in the form of its alkali salt which is thus removed from further oxidizing influence.

In our experiments we have found that manganese dioxide, or any other compound containing manganese, mixed with an amount of sodium hydroxide or other alkali hydroxide or alkali carbonate more than sufficient to combine with the benzoic acid to be formed in the reaction, and also to change the manganese compound present to the corresponding manganate salt, forms a suitable oxygen-carrying mixture. Small amounts of water are formed in the reaction and if a certain small portion of water be present in the mixture at the start, it does not interfere; however, more than 10% of water retards the reaction and still larger quantities prevent it altogether.

For the best results, the reaction should take place in a reaction chamber maintained at a temperature above 150° C. and not exceeding 500° C., at which latter temperature the decomposition of the benzoic acid salt formed is rapid. Below the lower temperature the reaction proceeds very slowly or not at all. The most favorable temperature is between 200° and 300°, in which range the reaction proceeds rapidly. In order to facilitate the combination of the gaseous oxygen with the solid material, vigorous stirring of the material is advisable.

The accompanying drawing illustrates an apparatus such as may be employed in the practice of the process. Said drawing shows the apparatus chiefly in section to illustrate the interior construction and arrangement and consists in a reaction chamber A, containing a stirrer B, adapted to be driven from any convenient power by a belt 10. A cooling jacket C, is mounted on the top of said reaction chamber A, being supported by suitable brackets or legs 11. The mixture containing the oxygen, or pure oxygen, is introduced from any appropriate source of supply, through a tube D. A discharge pipe E leads from the top of said reaction chamber into the cooling jacket C, where it forms a condensing coil, acting as a reflux condenser, and discharging at the top through a release valve 12. The cooling medium, as cold water, is introduced into the cooling jacket through an inlet pipe 13, near the bottom thereof, and discharged through an outlet pipe 14 leading therefrom near the top thereof. A heater 15, such as a gas burner, is arranged beneath the bottom of the reaction chamber, as shown.

In carrying out our process, a mixture of 25 parts of dibenzyl, 10 parts of manganese dioxide, and 100 parts of sodium hydroxide, the latter containing less than 10% of water, may conveniently be used. Any compound containing manganese may be substituted for the manganese dioxide, and the proportion used may vary within the widest limits. The manganese dioxide in the proportion given is merely a convenient form and proportion for the manganese content of the mixture. Also compounds of iron and of other metals capable of existing in more than one state of oxidation show the same catalytic effect, and may replace in exact amount the equivalent manganese compound in the above described mixture. Also a mixture of these compounds may be successfully used. The sodium hydroxide may be replaced in all or in part by any alkali hydroxide or carbonate, and this or its substitute may vary from any amount barely sufficient to unite with the benzoic acid to be formed in the reaction, to a very large excess.

The reaction mixture chosen is placed in a reaction chamber A and heated to the desired temperature between 150° C. and 500° C.; stirred vigorously by stirrer B; and air, or any gas mixture containing oxygen, or even pure oxygen, is then added through tube D and is passed continuously over the reaction mixture until the reaction is completed and no unchanged dibenzyl remains. According to the temperature chosen, the reaction mixture is a thick liquid or a semi-solid mass, higher temperatures making the mixture less viscous. As the reaction proceeds, the salt of benzoic acid separates out, making the mixture more viscous, but in the case of the mixture above given if the proper amount of sodium hydroxide is used, it remains liquid to the end. In case air is used as the source of oxygen, the residual nitrogen is discharged through the tube E, which is cooled by the water in cooling jacket C, to condense out vapors of unchanged dibenzyl and return them to the reaction chamber The oxygen-containing gas used as the source of oxygen may be maintained in the reaction chamber, A, at a pressure greater than atmospheric pressure, if desired.

In such a procedure, by regulation of the release valve 12, and suitable increase of the pressure of the gas entering through pipe D, the desired pressure may be maintained in the reaction chamber. By thus operating under gas pressures up to 500 pounds per square inch, the above described process is facilitated, and the losses of unchanged dibenzyl are greatly reduced.

The above described process explains fully how any one skilled in the art may prepare the alkali salt of benzoic acid from dibenzyl by oxidation indirectly with molecular oxygen. The apparatus shown is not the only one that can be used, and possibly not the best, but will give the desired result and is shown only to enable the process to be clearly understood. The isolation of the benzoate from the reaction mixture after the completion of the reaction is accomplished by any one of several well known methods. The free benzoic acid may easily be liberated from its salt by treatment with a strong acid, and may be purified by well known methods, and used for the purposes for which it is valuable.

It is to be emphasized that the benzoates, as well as the benzoic acid formed in this way, are much superior to the common benzoic acid and benzoates of commerce, as the latter are made by a chlorination process and contain small but objectionable amounts of chlorine. The benzoic acid and benzoates made by our process are strictly chlorine-free and thus have an enhanced value.

Having thus fully described our said invention, what we claim as new and desire to secure by Letters Patent, is:—

1. Process of preparing benzoic acid or compounds thereof, comprising subjecting dibenzyl to the action of molecular oxygen in presence of an oxygen carrier.

2. Process of preparing benzoic acid or compounds thereof, comprising subjecting dibenzyl to the action of molecular oxygen in presence of an oxygen carrier containing manganese.

3. Process of preparing benzoic acid or compounds thereof, comprising subjecting dibenzyl to the action of molecular oxygen in presence of an alkaline material and an oxygen carrier.

4. Process of preparing benzoic acid or compounds thereof, comprising subjecting dibenzyl to the action of molecular oxygen in presence of an alkaline material and an oxygen carrier containing manganese.

5. Process of preparing benzoic acid or compounds thereof, comprising subjecting dibenzyl to the action of molecular oxygen under superatmospheric pressure in presence of an oxygen carrier.

6. Process of preparing benzoic acid or compounds thereof, comprising subjecting dibenzyl to the action of molecular oxygen under superatmospheric pressure in presence of an oxygen carrier containing manganese.

7. Process of preparing benzoic acid or compounds thereof, comprising subjecting dibenzyl to the action of molecular oxygen under superatmospheric pressure in presence of an alkaline material and an oxygen carrier.

8. Process of preparing benzoic acid or compounds thereof, comprising subjecting dibenzyl to the action of molecular oxygen under superatmospheric pressure in presence of an alkaline material and an oxygen carrier containing manganese.

In witness whereof, we have hereunto set our hands and seals at Pittsburgh, Pa., this 18th day of April, A. D., nineteen hundred and seventeen.

GEORGE OLIVER CURME, Jr. [L. S.]
  HERMAN BUNSEN HEYN. [L. S.]

Witnesses:
  CLEMENT L. PERKINS,
  GLEN DAVID BAGLEY.